(12) United States Patent
O'Neil et al.

(10) Patent No.: US 10,761,598 B2
(45) Date of Patent: *Sep. 1, 2020

(54) SYSTEM AND METHOD FOR GENERATING WIRELESS SIGNALS AND CONTROLLING DIGITAL RESPONSES FROM PHYSICAL MOVEMENT

(71) Applicants: James M. O'Neil, Williamsville, NY (US); William Sack, Amherst, NY (US)

(72) Inventors: James M. O'Neil, Williamsville, NY (US); William Sack, Amherst, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,116

(22) Filed: Mar. 21, 2019

(65) Prior Publication Data

US 2019/0220085 A1 Jul. 18, 2019

Related U.S. Application Data

(63) Continuation of application No. 15/172,979, filed on Jun. 3, 2016, now Pat. No. 10,248,188.

(60) Provisional application No. 62/170,505, filed on Jun. 3, 2015.

(51) Int. Cl.
*G09G 5/00* (2006.01)
*G06F 3/01* (2006.01)
*G10H 1/00* (2006.01)

(52) U.S. Cl.
CPC ........... *G06F 3/011* (2013.01); *G10H 1/0066* (2013.01); *G10H 1/0083* (2013.01); *G10H 2220/145* (2013.01); *G10H 2220/321* (2013.01); *G10H 2220/336* (2013.01); *G10H 2220/395* (2013.01)

(58) Field of Classification Search
USPC ........ 345/156, 173, 174, 8, 633, 474; 482/8; 600/592, 595; 36/139; 348/164
See application file for complete search history.

(56) References Cited

U.S. PATENT DOCUMENTS

| | | | |
|---|---|---|---|
| 2009/0178305 A1* | 7/2009 | Maxwell | A43B 3/0005 36/139 |
| 2011/0009241 A1* | 1/2011 | Lane | A63B 24/0087 482/8 |
| 2011/0285853 A1* | 11/2011 | Chu | A63F 13/245 348/164 |

(Continued)

*Primary Examiner* — Thuy N Pardo
(74) *Attorney, Agent, or Firm* — Woods Oviatt Gilman LLP; Katherine H. McGuire, Esq.

(57) ABSTRACT

A system and method for generating wireless signals from the physical movement of a person utilizing a movement detection mechanism attached to the person wherein the system allows a person to manipulate the generated wireless signals to selectively control digital responses which may be in the form of sensory-perceivable outputs such as sounds and/or visual effects, for example, through the person's physical movement. Movement sensors attached to the person (e.g., on one foot or both feet) communicate with other system components such as microprocessors, transmitters and/or tactile interface controls, for example, to wirelessly send signal pulses from a person to a computer or mobile device and allow the person wearing the sensors and/or another person to selectively control the dynamics of the digital responses so to create a unique sensory output.

16 Claims, 9 Drawing Sheets

(56) References Cited

U.S. PATENT DOCUMENTS

| | | | |
|---|---|---|---|
| 2012/0253234 A1* | 10/2012 | Yang | A61B 5/1038 600/595 |
| 2015/0091790 A1* | 4/2015 | Forutanpour | G06F 3/011 345/156 |
| 2016/0166178 A1* | 6/2016 | Fuss | A61B 5/1038 600/592 |

* cited by examiner

SYSTEM AND METHOD FOR GENERATING WIRELESS SIGNALS AND CONTROLLING DIGITAL RESPONSES FROM PHYSICAL MOVEMENT

FIELD OF THE INVENTION

The present invention generally relates to a system and method for generating wireless signals generated from physical movement sensors and/or similar devices coupled to a person's body. The invention more particularly relates to such a system and method which also enables the selective control of the digital responses to the generated signals, including MIDI data (Musical Instrument Digital Interface), sounds, visuals, and/or interactive responses, for example.

BACKGROUND OF THE INVENTION

Electronic auditory and/or visual input/output systems and components such as musical controllers for MIDI compatible equipment, electronic tap dancing shoes, and the use of touch-screen interfaces for the remote control of electronics are well known in today's digital world. Musical or MIDI controllers are the hardware interface for the control of digital musical instruments. MIDI (Musical Instrument Digital Interface) is an industry standard data protocol for digital instruments established in the 1980's that remains in use to the present day. A musical keyboard is most typically used to "control" sound banks or synthesizers that are wired to the controller with MIDI cables. Percussive MIDI controllers, such as the Roland Corporation's OCTAPAD®, contain large rubber pads that when hit, trigger digital samples. MIDI controllers may also contain sliders, knobs or buttons that control recording of MIDI music. Novation's Launchpad uses buttons to act as switches for recording, or as drum pads for performing music.

Alternative MIDI musical controllers produced and marketed in the past have included breath controllers offered by Yamaha as optional accessories for their line of keyboard synthesizers produced in the 1980s (the DX7, DX11, CS01, and others). These breath controllers allowed the use of breath pressure to have the synthesizer send corresponding MIDI continuous control messages to modify the sound output. In the wake Yamaha's controller, other manufacturers have made and offered breath controllers that are freestanding and allow the user to add breath control of MIDI continuous controller messages to instruments lacking that control as a built-in feature. For example the TEControl USB MIDI Breath Controller can be used with a wide range of MIDI compatible musical equipment or computer software that accepts MIDI messages.

Previous inventors have tried to develop electronic tap-dance shoes that use pressure sensors or other means to detect a dancer's activity and then send corresponding MIDI notes, either through cables or wirelessly. For example, U.S. Pat. No. 5,765,300 entitled Shoe Activated Sound Synthesizer Device is directed to a shoe activated sound synthesizer device that enables movement of a shoe to be translated into audible sounds. The sound synthesizer device consists of a shoe in which there is disposed at least one trigger element capable of producing a trigger signal when the shoe is flexed to a predetermined degree. As the shoe is worn and is brought into contact with the floor, the shoe is flexed. By bringing different parts of the shoe into contact with the floor in a controlled manner, a person can selectively control the production of trigger signals from any trigger element contained within the shoe. A sound synthesizer circuit is provided that is coupled to each trigger element contained within the shoe. The sound synthesizer circuit produces an audible sound, via a speaker, when a trigger signal is received from the shoe. Pressure sensors have also been embedded in floors or floor-mounted surfaces and used as arcade or home game controllers: examples include Nintendo's Wii Fit Balance Board and Konami's Dance Dance Revolution. The Nike+ FUELBAND® is a device that tracks a user's movement and activity in order to track progress in fitness training. The Nike+ sensor may transmit a data packet to a receiver directly attached to a mobile device.

Additionally, wireless remote control of electronics hardware through an application on a mobile device or tablet computer is an expanding field. One example is the GoPro App, which allows a user full remote control over a GoPro camera's functions and record button, as well as providing a useful preview image of what the camera is photographing, if for example it is attached to the top of a helmet deeming the viewfinder not visible.

While the above prior art provides examples of signal generation through physical movement, there remains a need for a system and method which allows the manipulation of the response signals in real-time. The present invention addresses this, and other, needs in the art.

BRIEF SUMMARY OF THE INVENTION

A system and method for generating wireless signals from the physical movement of a person utilizing a movement detection mechanism attached to the person wherein the system allows a person to manipulate the generated wireless signals to selectively control digital responses which may be in the form of sensory-perceivable outputs such as sounds and/or visual effects, for example, through the person's physical movement. Movement sensors attached to the person (e.g., on one foot or both feet) communicate with other system components such as microprocessors, transmitters and/or tactile interface controls, for example, to wirelessly send signal pulses from a person to a computer or mobile device and allow the person wearing the sensors and/or another person to selectively control the dynamics of the digital responses so to create a unique sensory output.

In accordance with an aspect of the present invention, a system for creating a sensory output from a user's physical movements comprises one or more sensors configured to be removably attachable to a user's body. The one or more sensors may be adapted to detect movement and trigger a signal containing movement data in real-time. A transmitter is operably coupled to the one or more sensors to transmit the real-time signal and a receiver is coupled to a computing device with the receiver configured to receive the transmitted real-time signal. The computing device converts the movement data to an output signal wherein the output signal manifests as a sensory output comprising one or more of a visual signal, an interactive effect signal, a Musical Instrument Digital Interface (MIDI) signal or an audio signal.

In a further aspect of the present invention, the system may further comprise a tactile interface unit coupled to the receiver and computing device wherein the tactile interface unit is operable to selectively control and manipulate the output signal. The tactile interface unit may be configured to be removably attached to the user's body and to be operable by the user. Moreover, the tactile interface unit, the receiver and the computing device may be housed within a single mobile device configured to be removably attached to the user's body. Alternatively or additionally, the tactile interface may be remotely located from the user and may be operated by a second party.

In another aspect of the present invention, the tactile interface unit is an application running on a mobile device and is configured for wireless remote control of the output signals produced by the computing device. The output signals may be characterized by a note's length, a MIDI channel used, a MIDI continuous controller number sent, or any other parameters that can be modified in the digital output of the audio, visual or interactive effect signals.

In still a further aspect of the present invention, the transmitter may be a radio transmitter configured to generate and transmit wireless pre-MIDI signals, wherein the pre-MIDI data signals from the transmitter are converted by the computing device into MIDI notes, MIDI continuous controller messages or similar data protocol. The computing device may convert the wireless pre-MIDI signals into actual MIDI data at a higher data rate than the MIDI protocol to thereby reduce latency in the output of the output signal.

In an additional aspect of the present invention, at least one of the one or more sensors resides in a shoe configured to be worn by the user. A shim may also be placed within the shoe wherein the shim is configured to position the at least one sensor at a transverse arch or heel of the user's foot.

In another aspect of the present invention, the transmitter is housed within a transmitter box where the transmitter box further includes a microprocessor programmed to include a peak-detection algorithm. The microprocessor utilizes the peak-detection algorithm to convert movement data generated by the one or more sensors into discrete digital signals indicating event onsets to be transmitted by the transmitter.

In a further aspect of the present invention, one or both of the real-time signal and the output signal are communicated wirelessly over a local area network (LAN), a wide area network (WAN), a Cloud or the internet.

In still another aspect of the present invention, a system for creating sensory outputs from physical movements of a plurality of users comprises a respective set of one or more sensors configured to be removably attachable to a respective user's body. The one or more sensors may be adapted to detect movement and trigger a signal containing movement data in real-time for the respective user. A respective transmitter may be operably coupled to each respective set of one or more sensors to transmit the real-time signal for the respective user. A receiver may be coupled to a computing device and be configured to receive the transmitted real-time signal from each user. The computing device may then convert the movement data from each user to a series of output signals wherein the output signals manifest as sensory outputs comprising one or more of a visual signal, an interactive effect signal, a Musical Instrument Digital Interface (MIDI) signal or an audio signal.

In a further aspect of the present invention, a tactile interface unit may be coupled to the receiver and computing device where the tactile interface unit is operable to selectively control and manipulate the output signals. Additionally or alternatively, a respective tactile interface unit may be configured to be removably attached to each respective user where each respective tactile interface unit may be in communication with the receiver and computing device wherein each respective tactile interface unit is operable to selectively control and manipulate the output signals.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

Similar reference characters refer to similar parts throughout the several views of the drawings.

DETAILED DESCRIPTION OF THE INVENTION

In operation, one or more sensors (such as, but not limited to, pressure sensors, accelerometers and the like) may be placed on or near a foot or both feet. In the act of walking, running, dancing or other movement, a sensor may be triggered and read by detector, such as an analog-to digital converter. A microprocessor may be attached to the sensor and may transmit a wireless signal pulse to a computer. Computer software resident on the computer may then convert the wireless signal pulses into MIDI data (or a similar data protocol) that may be recorded as interoperable data or may be assigned to digital responses such as, but not limited to audible sounds including musical notes and beats; visual feedback in lighting effects or digital graphics; or interactive responses from a video game or digital display.

A user may record, loop or modify the MIDI data or the dynamics of the digital responses in real-time by using a suitable interface, such as through tactile finger movements upon an interface in conjunction with movement of his or her legs and feet. By way of example, the dynamics of the responses that may be changed in real-time by coordinating finger and feet movements include, but are not limited to, the modification of the precise timing and length of the digital effects produced or the qualities of the visuals or sounds that are being generated by a person's physical movements. As used herein, the term real-time refers to digital signals or responses that occur perceivably instantaneous with the underlying physical movement. As a result, systems design in accordance with the teachings of the present invention may have applications as a musical and/or scientific instrument used in such activities as dance performance, music production, athletic activities, art projects, entertainment systems, health diagnostics or medical therapies and the like.

Figure 1:
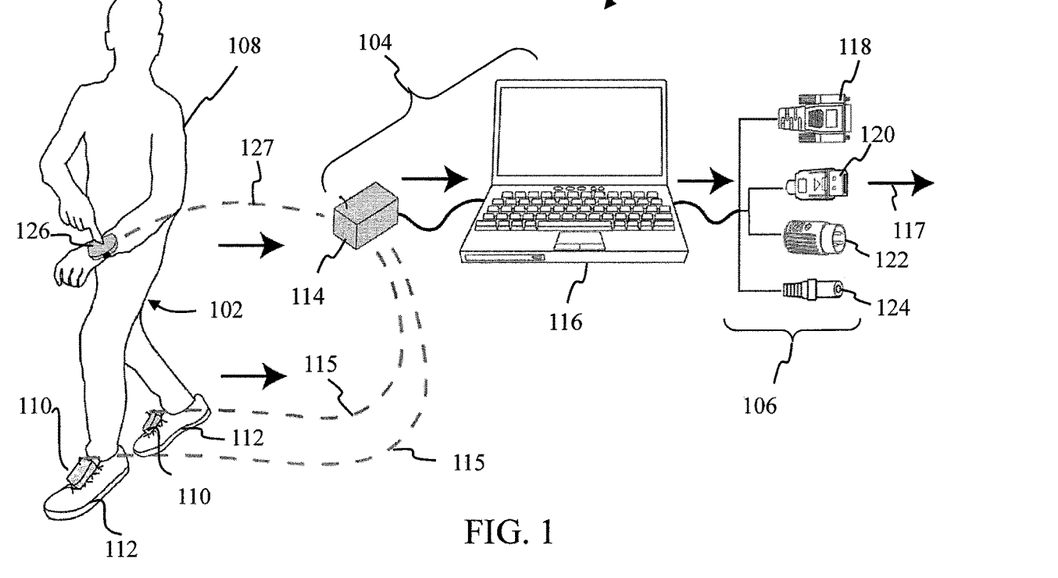
FIG. 1 is a schematic view of a system for generating wireless signals from physical movement in accordance with an embodiment of the present invention.
Figure 1A:
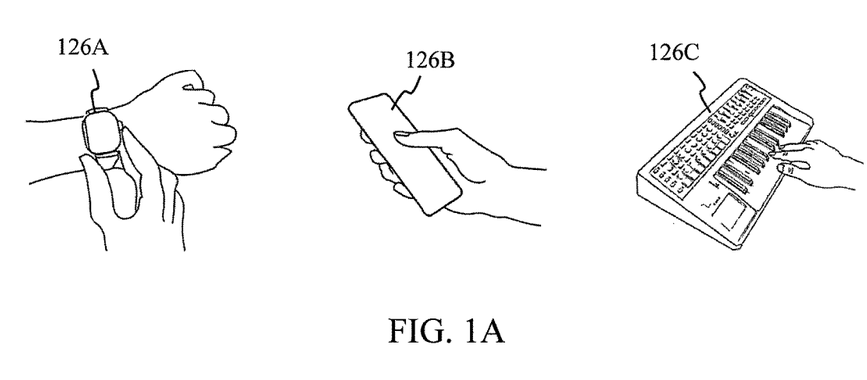
FIG. 1A are schematic views of alternative tactile interfaces that may be used within a system of the present invention.

Turning now to the drawings, with particular reference to FIG. 1 thereof, a system for generating wireless signals generated from physical movement sensors is generally indicated by reference numeral 100. System 100 may comprise include a signal generation component 102 configured to wirelessly communicate movement related sensor data to a signal receiver component 104 before eventual broadcast (i.e. audio and/or visual responses) via one or more output modalities 106. As discussed in greater detail below, signal generation component 102 may be worn upon a user 108 and include one or more sensor and radio transmitter units 110 located on or proximate to the user's shoe or foot 112 and, optionally, a tactile interface unit 126. Respective sensor and radio transmitter units 110 may be worn on one or both feet. Signals 115 generated by the sensors and transmitted by the transmitters may be received by a radio receiver 114 in communication with a computing device 116, such as a smart phone, laptop, tablet or PC computer. Software resident within computing device 116 may then condition the received signals before eventual output 117 to appropriate output devices, such as via VGA output 118 (for visual signals), HDMI output 120 (for interactive effects), MIDI output 122 (for digital notes and beats) and/or digital output 124 (for sounds). A tactile interface unit 126 may also be coupled 127 to receiver component 104 wherein tactile interface 126 may be used for control and manipulation of output 117. As shown in FIG. 1A, non-limiting examples of possible tactile interface units 126 may include a touch-screen device 126A attached to the wrist, an interface responsive to an app on a mobile device 126B held in the hand or a MIDI controller keyboard 126C manipulated by the fingers.

Figure 2:
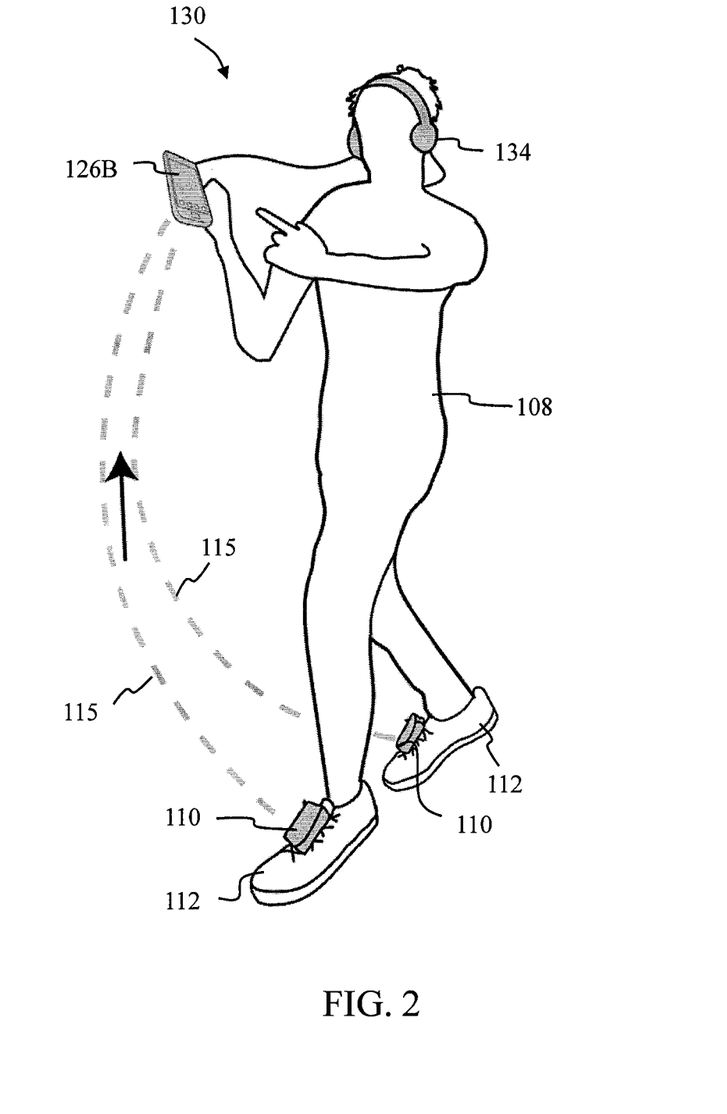
FIG. 2 is a schematic view of a system for generating wireless signals from physical movement in accordance with another embodiment of the present invention.

As shown generally in FIG. 2, an alternative embodiment of a system 130 for generating wireless signals generated from physical movement sensors may utilize a single mobile device 126B (such as a smart phone or tablet computer) that contains a built-in touch-screen tactile interface 126 and receiver component 104 (radio receiver 114 and computing device 116) configured for digital output of sound to headphones 134. Mobile device 126B may wirelessly receive signals 115 generated by sensors and radio transmitter units 110. In this manner, user 108 may use system 130 as a personal musical instrument capable of producing controllable digital sounds by virtue of coordinating commands of the tactile interface with physical movements of the feet and body.

In the embodiments shown in FIGS. 1 and 2, tactile interface unit 126 may be strapped to the wrist (FIG. 1) or held in the hand (FIG. 2). By pressing the interface with the fingers, user 108 may wirelessly change the precise timing and/or length of the digital effects and/or the quality of the digital responses produced, including the rhythmic timing and/or length of MIDI notes, for example. Via tactile interface unit 126, user 108 may be able to change the assignment of a particular MIDI note to a particular sensor and/or a particular physical movement that is activated by a pressure sensor and/or accelerometer. In this manner, MIDI continuous controller data can be modified to create dynamic changes in digital effects and/or user 108 launch presets of different combinations of digital effects in order to transpose or arpeggiate musical notes and/or animate visual patterns. Tactile interface unit 126 may also display visual feedback confirming the digital effects being produced, such as a preview of graphics that are being projected on a larger screen and/or the user's current score if the system is being used in a multi-user video game environment, for example. As a result the conclusive aesthetic result of system 100/130 is a series of coordinated digital responses in the form of sounds and/or visuals that are triggered and controlled by a user's physical movements.

Figure 3:
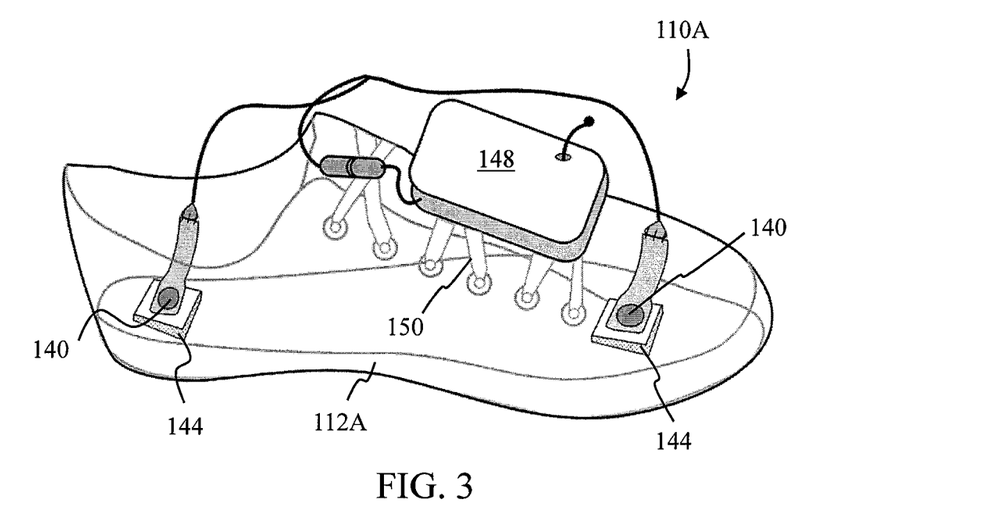
FIG. 3 is a schematic view of a device used to generate wireless signals from physical movement in the embodiments of the system shown in FIGS. 1 and 2.
Figure 4:
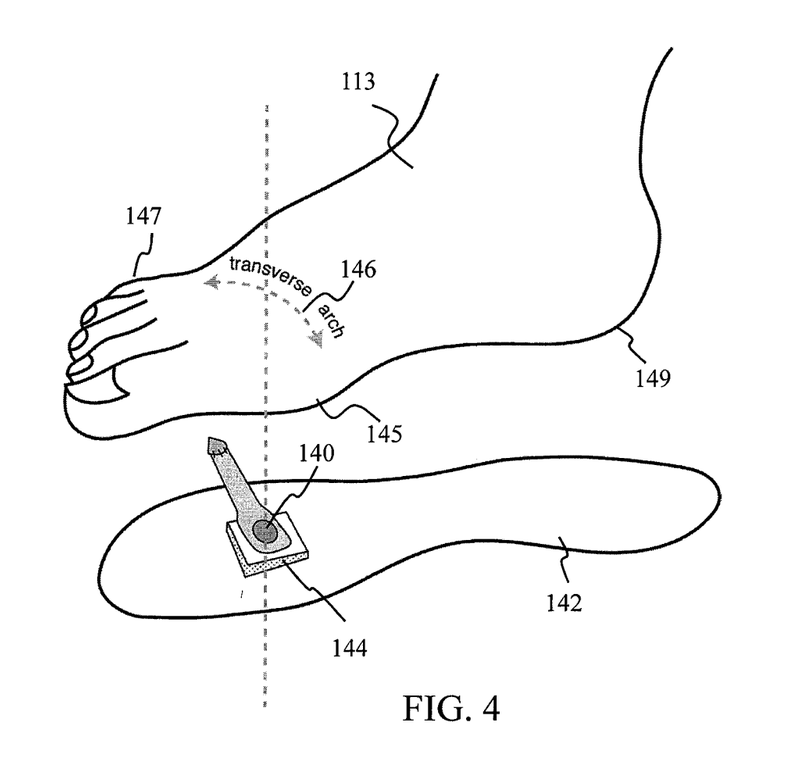
FIG. 4 is a schematic view of a pressure sensor layout used within the device shown in FIG. 3.

With reference to FIG. 3, an embodiment of a sensor and radio transmitter unit 110A is shown. Sensor and radio transmitter unit 110A may be configured to mount to a user's shoe 112a with pressure sensors 114 positioned beneath the user's foot 113 and adhered to the innersole 142 of shoe 112A. With additional reference to FIG. 4, utilizing foot movement to create wireless signals 115 does not require specialized footwear. For instance, one or more pressure sensors 140 may be attached to a shim or raised support 144 that is positioned onto a removable innersole 142 of any suitable shoe. In accordance with an aspect of the present invention, at least one pressure sensor 140 (an optional shim 144) is positioned between the transverse arch 146 of foot 113 and innersole 142 when inserting foot 113 into shoe 112A, and more particularly in the area of the transverse arch of the foot located between the ball of the foot 145 and the smallest toe 147. A pressure sensor 140 (an optional shim 144) may also be placed near the heel 149 of foot 113. The size and orientation of each shim 144 is selected so as to ensure contact between the innersole and the foot, while also minimizing user awareness of shim 144 and/or pressure sensor 140 and any discomfort that may result therefrom. Further, the shape and size of pressure sensors may be modified or increased/decreased in order to selectively define the zone of sensitivity, that is, where on the foot is pressure required to be sensed by the sensor 140 before initiating a signal 115.

Figure 5:
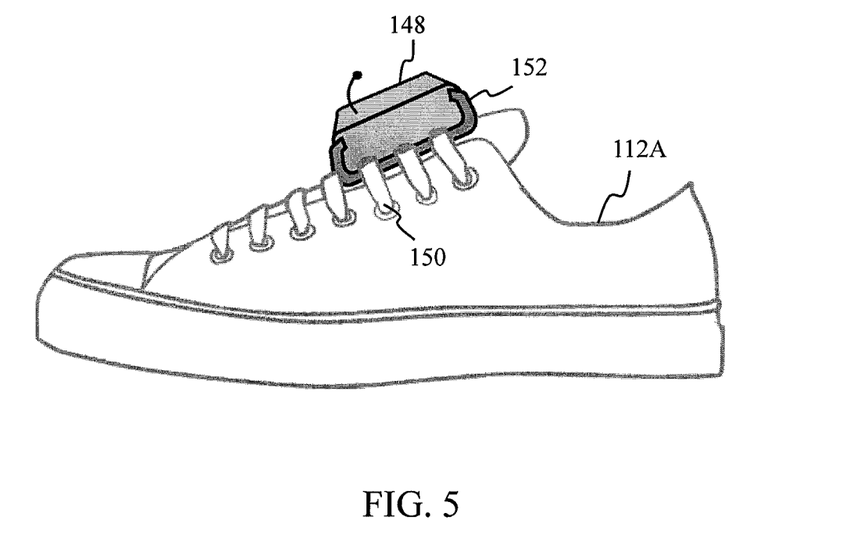
FIG. 5 is a schematic view of a signal transmitter bracket used within the device shown in FIG. 3.
Figure 6:
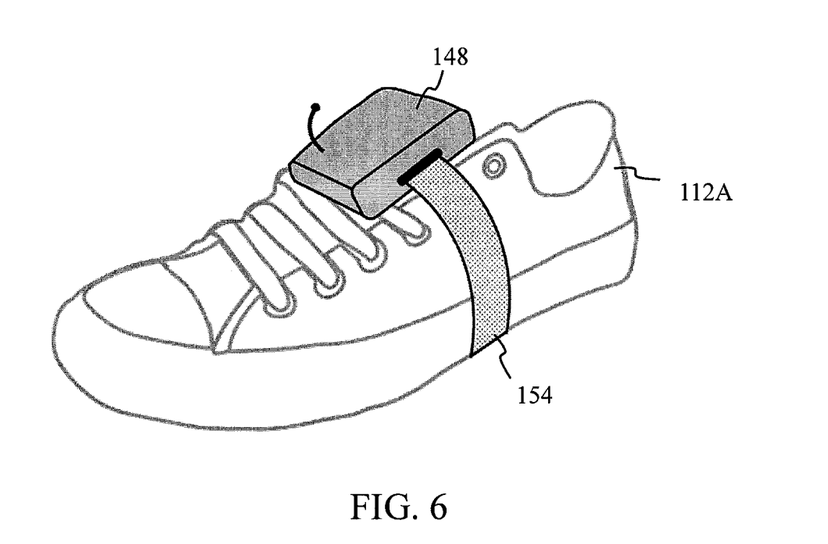
FIG. 6 is a schematic view of a signal transmitter strap used within the device shown in FIG. 3.

As shown in FIG. 3, a radio transmitter box 148 may be releasably secured to laces 150 of shoe 112A. For instance, as shown in FIG. 5, radio transmitter box 148 may be secured to laces 150 by way of a bracket 152 slid under laces 150 of shoe 112A. Radio transmitter box 148 may then be releasably mounted to bracket 152 via a releasable fastener (not shown), such as a snap, magnets, hook-and-loop material and the like. In this manner, radio transmitter boxes 148 may be removed when not needed and/or may be shared between people. Alternatively, as shown in FIG. 6, a strap 154 may be wrapped around the body of the shoe with the radio transmitter box 148 releasable attached to the strap.

Figure 7:
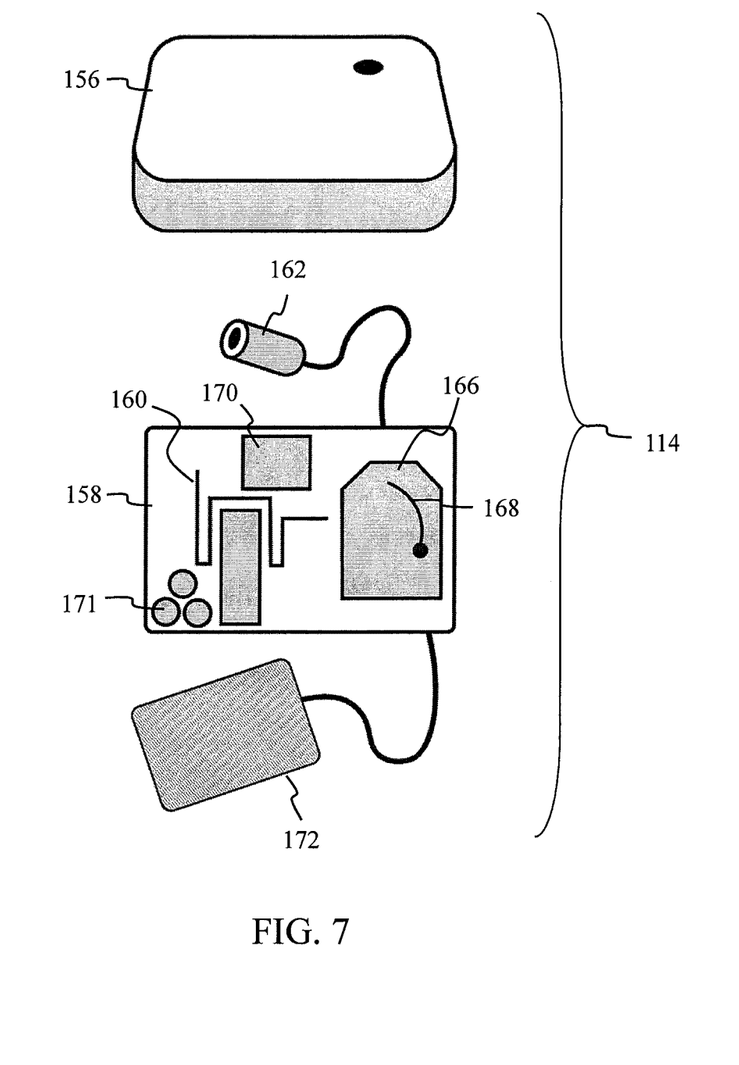
FIG. 7 is a schematic view of the components within a signal transmitter used within the system shown in FIGS. 1 and 2.

As generally shown in FIG. 7, radio transmitter box 148 may include a housing 156 containing a printed circuit board 158 having an analog to digital converter circuit 160 configured to receive analog sensor data from pressure sensors 140 (such as via external jack 162) and convert such analog sensor data into digital signals for interrogation by microprocessor 164. Interrogated digital signals may then be wirelessly transmitted via wireless transmitter 166 (which may also include an antenna 168 configured for digital broadcast). In accordance with an aspect of the present invention, radio transmitter box 148 may also include an accelerometer 170 configured to sense and output sensor data regarding movement of radio transmitter box 148. By way of example, signals outputted by accelerometer 170 may trigger a selected output 117 solely through user movement without requiring footfall and activation of pressure sensor 140. Radio transmitter box 148 may also include a battery 172 configured to provide necessary power to box components. It should be understood by those skilled in the art that any suitable battery may be used, including but not limited to non-rechargeable and rechargeable batteries. Light emitting diodes (LEDs) 171 may be also included to provide visual indication that radio transmitter box 148 and its various internal components are operating properly or to display colors synchronized to musical notes or from the user's settings. It should also be noted that by miniaturizing the electronics of the of the radio transmitter unit 110A, the scale, weight and power consumption may be reduced.

Figure 8:
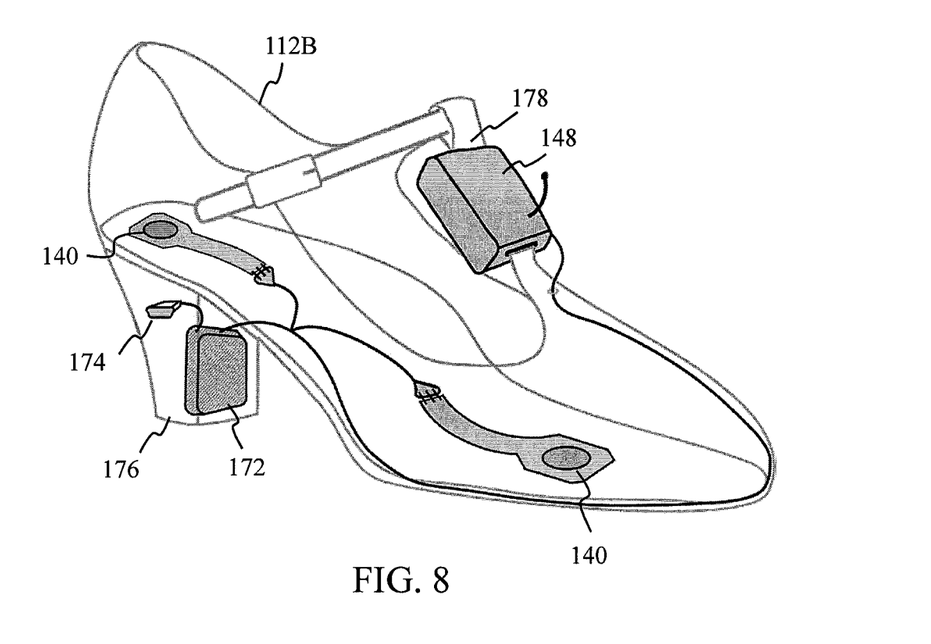
FIG. 8 is a schematic view of an alternative device used to generate wireless signals from physical movement in the embodiments of the system shown in FIGS. 1 and 2.

Turning now to FIG. 8, a hard soled dance shoe 112B may be modified to accommodate one or more sensors 140 and a radio transmitter box 148. A battery 172 (and optional battery recharging port 174 in the case of battery 172 being a rechargeable battery) may be embedded into the heel 176 of the shoe. By situating battery 172 within heel 176, the size and weight of radio transmitter box 148 may be reduced so that radio transmitter box 148 may more comfortably be attached to a strap 178 on dance shoe 112B.

Figure 9:
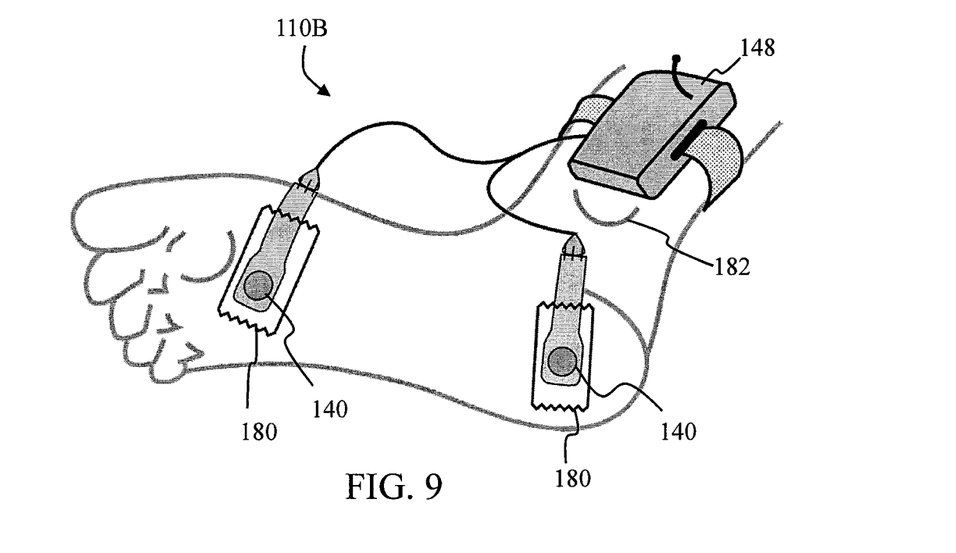
FIG. 9 is a schematic view of an alternative pressure sensor layout used within the device shown in FIG. 3.

As shown in FIG. 9, in an alternative embodiment 110B, one or more pressure sensors 140 may be directly affixed to a user's foot 113, such as through an adhesive 180. A radio transmitter box 148 may then be releasably secured to the user's body, such as at or near user's ankle 182. In this manner, user 108 may generate wireless signals 115 without requiring any shoes, but merely through impact of his or her bare foot upon a surface. While not limited strictly thereto, embodiment 110B may be suitable for use as a scientific instrument for developing physical therapies to improve a person's foot placement and/or gate, including therapies for foot pronation, walking disorders and/or physical movement disabilities, for example. By adhering pressure sensors 140 directly to the skin of the foot and strapping radio transmitter box 148 to ankle 182, a user can walk barefooted while the system would trigger sounds to encourage proper heel-to-toe foot movement and/or provide interactive responses and/or the recording of data, for example, to assist the person in therapy or diagnosis. Alternatively, user 108 may elect to wear shoes while pressure sensors 140 are directly affixed to foot 113.

Figure 10:
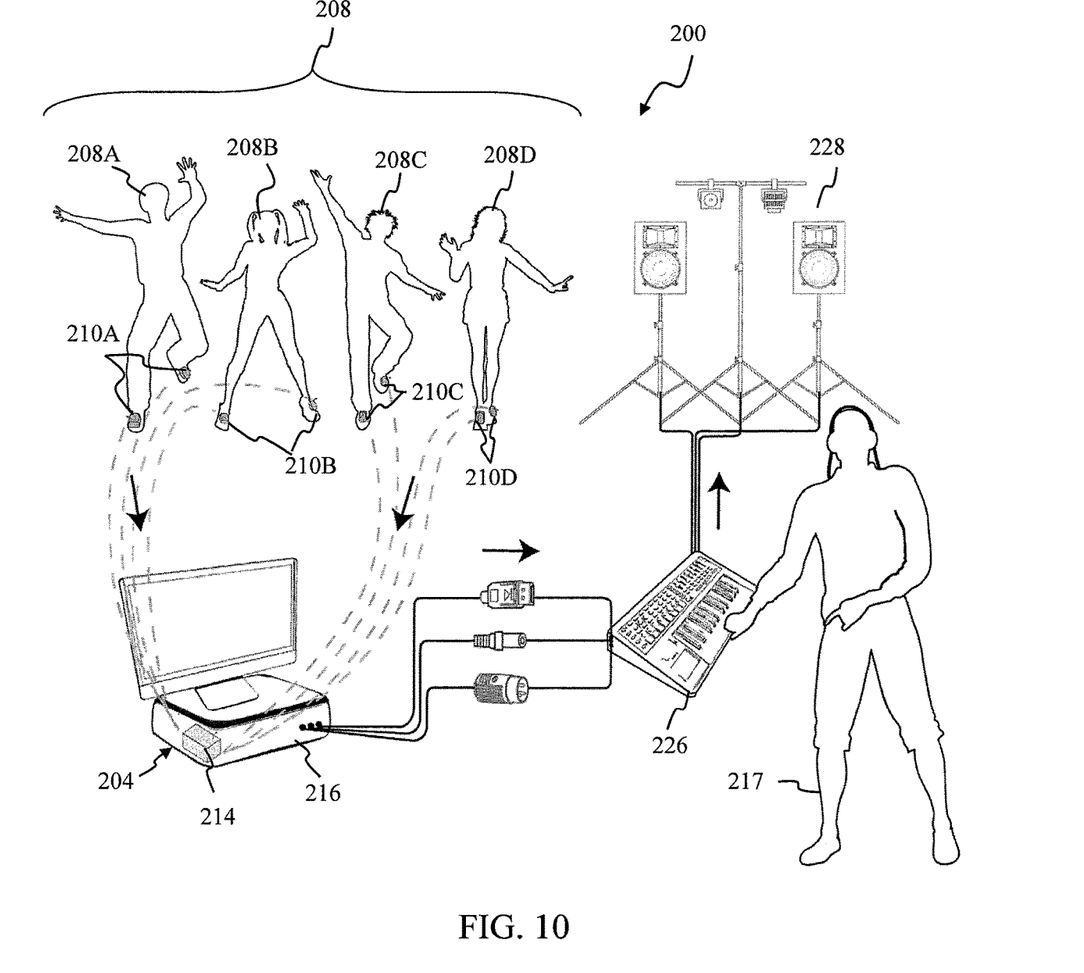
FIG. 10 is a schematic view of a system for generating wireless signals from physical movement by more than one performer in accordance with another embodiment of the present invention.
Figure 11:
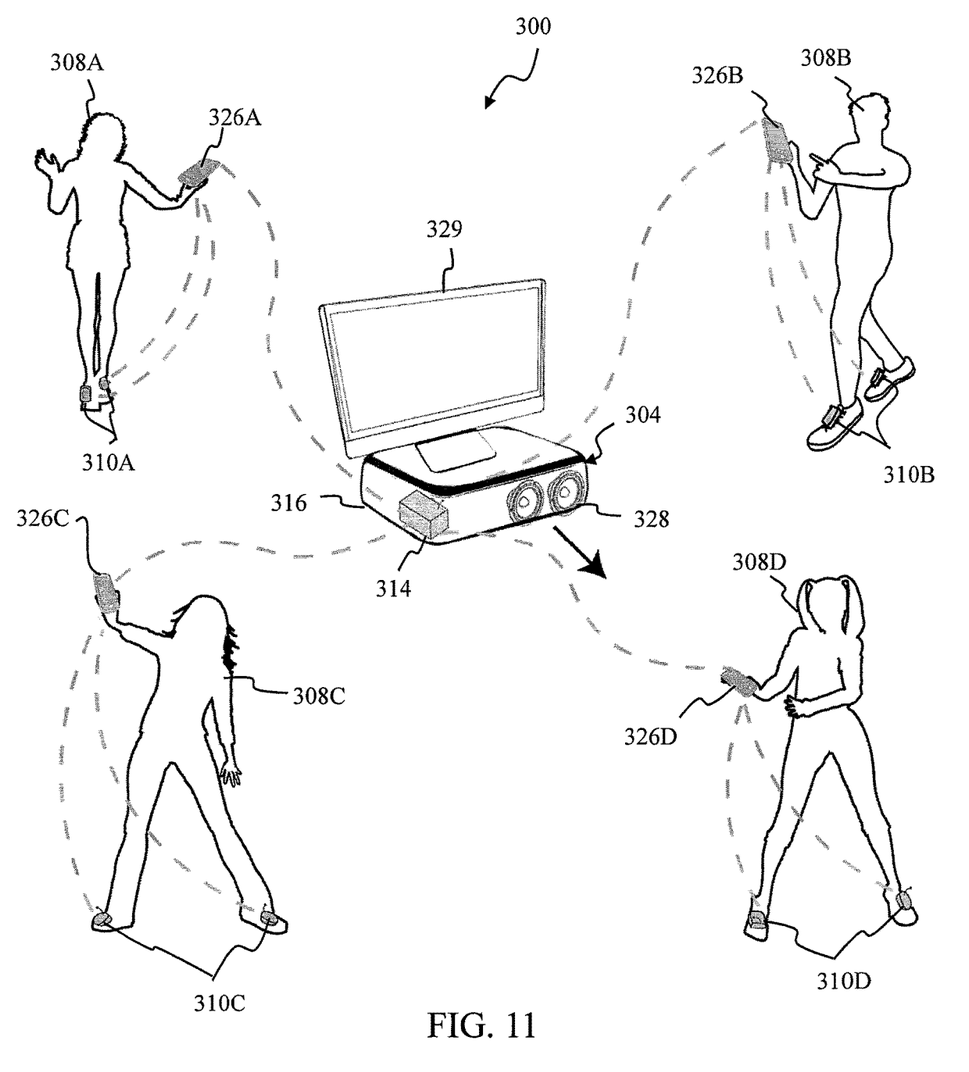
FIG. 11 is a schematic view of a system for generating wireless signals from physical movement by more than one performer wherein each performer may remotely control system outputs in accordance with another embodiment of the present invention.
Figure 12:
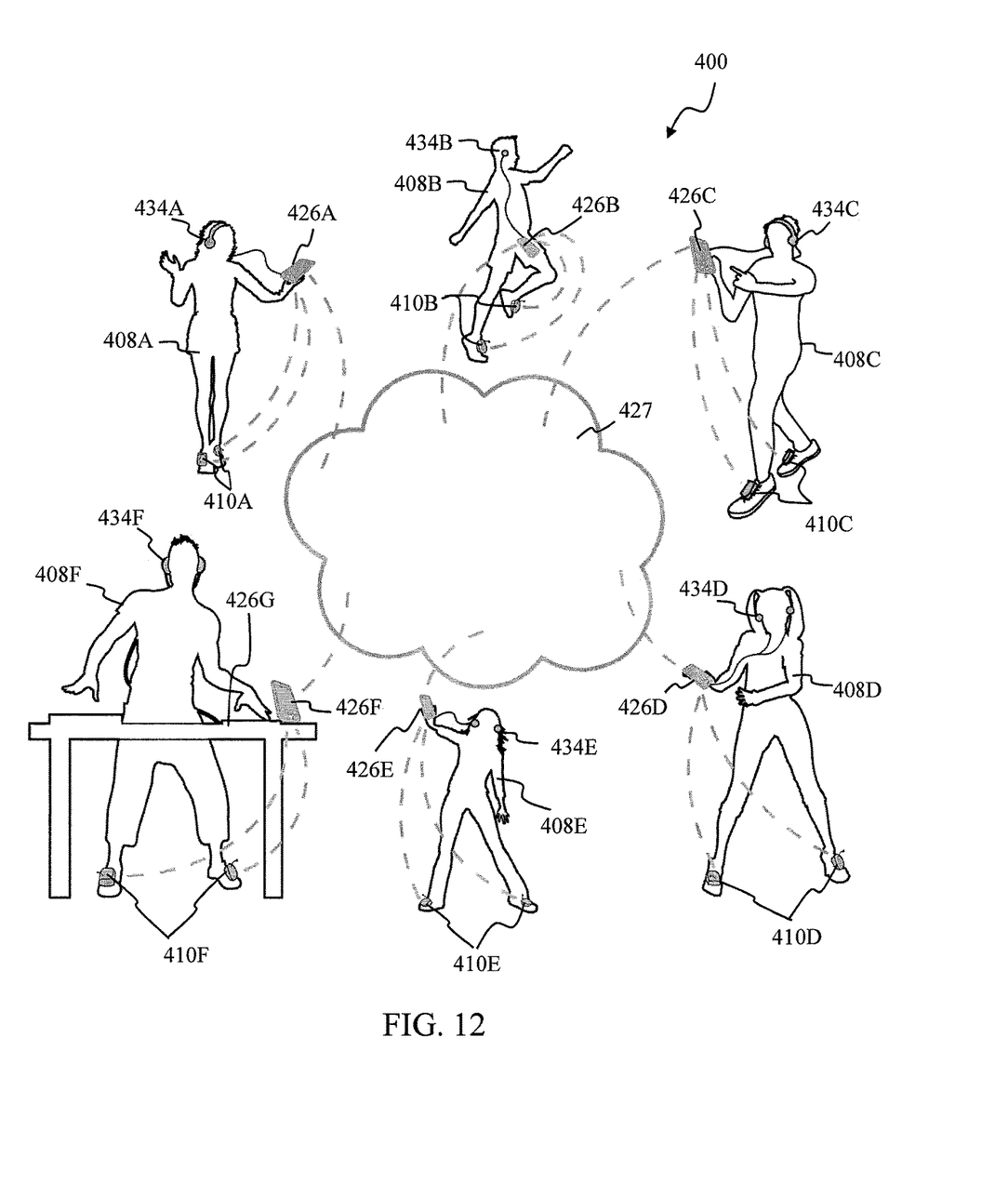
FIG. 12 is a schematic view of a system for generating wireless signals from physical movement by more than one performer wherein a non-performer may remotely control system outputs in accordance with another embodiment of the present invention.

FIGS. 10 through 12 show alternative embodiments of the present invention wherein a respective system generates wireless signals generated from physical movements from a plurality of individuals. By way of example, such individuals may be members of a dance/music ensemble or may be players in a multi-user video game environment.

With reference to FIG. 10, a multi-person system 200 has a group of people 208 wherein each member 208A-208D of the group is equipped with a respective sensor and radio transmitter unit 210A-210D. It should be noted that while shown and described as having four members, multi-person system 200 may be used with any size group of users and such alternative group sizes are to be considered within the teachings of the present invention. Each respective sensor and radio transmitter unit 210A-210D may be in wireless communication with common signal receiver component 204, such as but not limited to a turnkey computer 216 having an external or internal radio receiver 214. Signal receiver component 204 may then be operated by a dedicated DJ or technician 217, such as via a MIDI controller 226, to produce sound, lighting or video effects, such as via speaker/lighting unit 228. In this manner, group 208 may perform as a dance or musical ensemble or may interact with a dance simulation gaming program or app (such as country-line dancing) that responds to each member's physical movement without confining the individual members to a camera-based or environmental motion tracking system.

Multi-person system 300, as shown in FIG. 11, is similar to multi-person system 200 described above, with the exception that DJ/technician 217 may be omitted. Rather each member 308A-308D of the group includes a respective sensor and radio transmitter unit 310A-310D wirelessly coupled to a respective tactile interface unit 326A-326D which in turn is in wireless communication with a common signal receiver component 304 on a local area network (LAN) that can be controlled remotely by each member 308A-308D via each respective tactile interface unit 326A-326D. Signal receiver component 304 may output sound, lighting or video effects signals similar to system 200 or signal receiver component 304 may comprise an external or internal radio receiver 314 coupled to a turnkey computer 316 having built in speakers 328 and video display 329. In this manner, and by way of example, the group may perform as a dance or music ensemble or players in a multi-user video game.

FIG. 12 shows a multi-person system 400 similar to system 300 described above wherein individual members 408A-408E of a group includes a respective sensor and radio transmitter unit 410A-410E wirelessly coupled to a respective tactile interface unit 426A-426E which in turn is in wireless communication with the Internet, Cloud or a wide area network (WAN) 427. Each respective sensor and radio transmitter unit 410A-410E and its digital output may be controlled remotely by each member 408A-408E via each respective tactile interface unit 426A-426E. Audio outputs may be heard by each member via respective headphones 434A-434F Additionally or alternatively, a dedicated DJ or technician 408F (who may also be an active member of the group and have a respective sensor and radio transmitter unit 410F and respective tactile interface unit 426F) may control signal outputs, such as through a MIDI controller 426G similar to that describe above with regard to FIG. 10. In this manner, system 400 may enable members to work collaboratively in real-time even when one or more of the members is remotely located from the other members of the group. By way of example, system 400 may enable concerted group activities in multi-user video games or assisting a team to move together in a drill or routine.

In each of the above embodiments, when a user steps onto a pressure sensor 140, it is activated. When a user spins the body or moves a leg through the air, accelerometer 170 is activated. Both pressure sensor(s) 140 and accelerometer(s) 170 send electrical signals to the analog-to-digital converter circuit 160. (See FIG. 7). Microprocessor 164 detects a peak in the pressure wave or acceleration curve and determines a discrete point that is transmitted as a wireless pulse in the signal from the transmitter 166 to the receiver 114. Computer 116 (or tactile interface unit 126) may then convert the wireless signal of pulses into audible sounds including musical notes and beats and/or visual feedback in lighting effects and/or digital graphics and/or interactive responses from a video game or digital display, for example. Microprocessor 164 may be programmed to include a peak-detecting algorithm that converts these continuous pressure waves and acceleration curves to discrete pulses. However, in operation, the user may require a single note to be generated from a single footstep, so any additional pulses are be filtered out by a clock function within the software to thereby convey a response of a single note from a single footstep. This could be optionally activated in the system settings. In typical physical movements, such as walking, people alternate footsteps between the left and right feet. In order to generate a scale of musical notes from these alternating footsteps, each signal pulse emanating from the combined left and right radio transmitters is numbered sequentially. The receiver and computer may also contain software capable of numbering the sequence of pulses, and translating them into MIDI note numbers or pitches, beats or tones in a musical scale.

In each of the above embodiments, when movement is detected, such as through pressure sensor 140 and/or accelerometer 170, a wireless signal 115 of pulses is transmitted via wireless transmitter 166 to receiver component 104. By coordinating inputs within tactile interface 126 with physical movement of the feet and body, a person can modify the timing and length of the digital effects and/or the qualities of the visual and/or sound responses that are being generated by a person's physical movements.

In accordance with an aspect of the present invention, signal processing flow begins with pressure waves and acceleration curves generated by one or more sensors 140/accelerometers 170 attached to the body of a user 102 that are triggered by physical movement. (See e.g., FIGS. 1 and 7). A peak-detecting algorithm stored on the microprocessor 164 identifies the peak of the pressure wave or acceleration curve and signals it as a low latency wireless pulse to the radio receiver 114. Computer 116 (or tactile interface unit 126) converts the signal of pulses into operable data, for example MIDI notes and beats. The computer software numbers the pulses in a sequence determined by the user, then filters out unwanted pulses, quantizes the notes to a musical grid or modifies them based on the timing of the measures of music by sending the notes through an envelope. The resulting digital response can be seen or heard in real-time, and for example MIDI data can be recorded by the computer or controlled and manipulated in real-time by a tactile interface unit either worn by the person generating the physical movement (see FIG. 2) or by a DJ/Technician (see FIG. 10) controlling the dynamics of multiple people wearing sensors and radio transmitters. By way of example, a user or DJ/technician may modulate all of the notes being generated by multiple users to a different musical scale, chord or key at a specific instant in time or produce a unified aesthetic change in the digital output of the system.

As used herein, the term "real-time" refers to digital signals or responses that occur perceivably instantaneous with the underlying physical movement. That is, the digital signal or response originates at the sensor or accelerometer within about 500 milliseconds to about 50 nanoseconds, and more preferably between about 1 millisecond and about 100 milliseconds, from the time of peak detection by the algorithm to transmission of the digital signal to the receiver. In this manner, an output signal and the resultant audio, visual and/or other effects are perceived by the user and any spectators as occurring substantially simultaneously with the user's movements. In other words, there is no noticeable delay between a user's movements and the resultant effect.

A method for synchronizing the MIDI signals of the system may be utilized for generating harmonious and rhythmically unified digital responses from a group of persons (see FIGS. 10-12) generating pulses from physical movement. The synchronization may involve quantizing the input of the MIDI notes to the beats and measures of the music. This involves modifying the precise time notes are played by shifting them to an established temporal grid. The use of a pitch envelope can modify incoming notes (generated by the feet) to trigger specific pitches at set beats of music or instants in time. The modifications of MIDI signals may either expand or limit the amount of pitches generated by the feet.

The synchronization of signals generated by multiple users to a single receiver and computer produces the digital response of dancing with a partner, or choreographed group movements. Synchronization of digital responses transmitted through a LAN computer network (see FIG. 11) or the internet (see FIG. 12) enables remote users to dance together, or send signals from physical movements generated by multiple users across computer networks in real-time.

As shown in the above reference embodiments, a computer may include an internal radio receiving unit or an external receiving unit coupled to a computer, such as via a USB port. In accordance with an aspect of the present invention, the signal receiver component 104 may utilize the IEEE 802.15.4 networking protocol for fast point-to-multipoint or peer-to-peer networking. Bluetooth LE (low energy) and/or Bluetooth 4.0 and later revisions of the protocol may offer a fast data transfer interval for low latency, real-time, wireless signal transmission and reception. Utilizing the Bluetooth 4.0 protocol may allow radio transmitter boxes that are removably attachable to a person's body to communicate directly with Bluetooth 4.0 supported devices.

Tactile interface unit 126 may provide for real-time control of the dynamics of the digital response effects emanating from the computer. The tactile interface may be operated by a user's fingers and may be capable of modifying the MIDI signals produced by the radio receiver and computer. In operation, a user moves his or her feet thereby activating sensors and generating wireless pulses as described above. Coordinately, the user's fingers touch tactile interface unit 126 so as to selectively modify the note pitch, length or any other MIDI parameters.

As described above, tactile interface unit 126 may be a touch-screen device attached to the wrist, be contained in an app on a mobile device held in the hands, or be a MIDI controller keyboard manipulated by the fingers. Tactile interface unit may be utilized to alter the system settings such as adjusting the sensitivity of the pressure sensors, changing the preset sound or digital effect in real-time or altering the pitch of the note in real-time. Any digital event onset including MIDI events can be triggered as a digital output from the computer and dynamics such as the length and type of sound or visual effect can be controlled and modified by the tactile interface.

While the inventive system and method have been shown and described with reference to certain preferred embodiments thereof, it will be understood by those skilled in the art that various changes in form and details may be made therein without departing from the spirit and scope of the invention as described.

What is claimed is:

1. A system for creating a sensory output from a user's physical movements, the system comprising:
   a) one or more sensors configured to be located on or proximate to a user's body, wherein the one or more sensors are adapted to detect the user's movement and generate movement data in real-time, wherein the movement data comprises one or both of pressure wave data and acceleration curve data;
   b) a radio transmitter unit comprising a transmitter and a microprocessor, wherein the microprocessor is coupled to the one or more sensors and the transmitter and is programmed with a peak-detection algorithm wherein the microprocessor is operable to detect an event onset of a pressure peak in the generated movement data, convert the movement data into a discrete digital pulse having a pulse length and to transmit the digital pulse as a first signal;

c) a receiver configured to receive the transmitted first signal; and d) a computing device configured to convert the first signal to a second signal wherein the computing device quantizes the second signal and modifies the timing to a pre-selected temporal grid so that the second signal manifests as a real-time Musical Instrument Digital Interface (MIDI) signal having a note length determined as a function of the pulse length of the digital pulse of the first signal.

2. The system of claim 1 further comprising:

d) a tactile interface unit coupled to the receiver and computing device, the tactile interface unit operable to selectively control and manipulate the MIDI signal.

3. The system of claim 2 wherein the tactile interface unit is configured to be removably attached to the user's body and to be operable by the user.

4. The system of claim 3 wherein the tactile interface unit, the receiver and the computing device are housed within a single mobile device configured to be removably attached to the user's body.

5. The system of claim 2 wherein the tactile interface unit is an application running on a mobile device and is configured for wireless remote control of the MIDI signals produced by the computing device wherein the MIDI signals are characterized by the note length, a MIDI channel used or a MIDI continuous controller number sent.

6. The system of claim 2 wherein the tactile interface is remotely located from the user and operated by a second party.

7. The system of claim 1 wherein the transmitter is a radio transmitter configured to generate and transmit the first signal as a wireless pre-MIDI signal that is converted by the computing device into the MIDI signal comprising MIDI notes or MIDI continuous controller messages.

8. The system of claim 7 wherein the computing device converts the wireless pre-MIDI signal into the MIDI signal at a higher data rate than the MIDI protocol to thereby reduce latency in the output of the output signal.

9. The system of claim 1 wherein at least one of the one or more sensors is located on or proximate to the user's foot.

10. The system of claim 9 wherein the one or more sensors reside within a shoe, wherein the system further includes a shim within the shoe wherein the shim is configured to position the at least one sensor at a transverse arch or heel of the user's foot.

11. The system of claim 9 the microprocessor further includes a clock function configured to isolate and transmit the first signal.

12. The system of claim 1 wherein one or both of the first signal and the second signal are communicated wirelessly over a local area network (LAN), a wide area network (WAN), a Cloud or the internet.

13. The system of claim 1 wherein the computing device includes software that numbers successive first signals in a sequence selectively chosen by the user and quantizes the MIDI signal to a musical grid or modifies the note length of the MIDI signal based on a timing of the measures of music by sending the sensory output through an envelope.

14. The system of claim 1 wherein the real-time MIDI signal is generated, transmitted and converted in less than 50 milliseconds.

15. The system of claim 14 wherein the real-time MIDI signal is generated, transmitted and converted in 15 to 30 milliseconds.

16. The system of claim 1 wherein the real-time MIDI signal is further modulated to a musical scale, chord or key.

* * * * *